(12) United States Patent
Han et al.

(10) Patent No.: US 10,981,310 B2
(45) Date of Patent: Apr. 20, 2021

(54) METHOD OF MANUFACTURING RADAR TRANSPARENT COVER FOR VEHICLES AND RADAR TRANSPARENT COVER MANUFACTURED THEREBY

(71) Applicants: Hyundai Motor Company, Seoul (KR); Kia Motors Corporation, Seoul (KR)

(72) Inventors: Ju-Wan Han, Seoul (KR); Woo-Jae Kwon, Gunpo-si (KR); Sung-Ho Choi, Suwon-si (KR); Yong-Suk Shin, Anyang-si (KR); Se-Wook Oh, Anyang-si (KR); Tae-Yong Hong, Suwon-si (KR); Seong-Ho Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 450 days.

(21) Appl. No.: 15/814,130

(22) Filed: Nov. 15, 2017

(65) Prior Publication Data

US 2018/0162028 A1 Jun. 14, 2018

(30) Foreign Application Priority Data

Dec. 14, 2016 (KR) .......................... 10-2016-0170781

(51) Int. Cl.
*B29C 45/16* (2006.01)
*B60R 13/00* (2006.01)
(Continued)

(52) U.S. Cl.
CPC .......... *B29C 45/16* (2013.01); *B29C 45/0003* (2013.01); *B29C 65/02* (2013.01); *B60R 13/005* (2013.01); *G01S 13/931* (2013.01); *H01Q 1/40* (2013.01); *H01Q 1/42* (2013.01); *H01Q 1/422* (2013.01); *B29C 2045/0079* (2013.01);
(Continued)

(58) Field of Classification Search
CPC ..... B29C 45/16; B29C 65/02; B29C 45/0003; B29C 2045/0079; B29C 45/1615; B29C 45/1418; H01Q 1/422; H01Q 1/42; H01Q 1/40; H01Q 1/3233; B60R 13/005; G01S 2013/93271; B29L 2031/3456;
(Continued)

(56) References Cited

FOREIGN PATENT DOCUMENTS

| JP | 2007-013722 A | 1/2007 |
|---|---|---|
| JP | 2008-230497 A | 10/2008 |

(Continued)

OTHER PUBLICATIONS

English translation of JP2009-18790 A from IP.com (Year: 2009).*

*Primary Examiner* — Robert J Grun
(74) *Attorney, Agent, or Firm* — Morgan, Lewis & Bockius LLP

(57) ABSTRACT

A method of manufacturing a radar transparent cover may include steps of: injection molding a first transparent cover; inserting into a mold the first transparent cover made by the step of injection molding the first transparent cover and then, double injection molding a color resin on a back surface of the first transparent cover; and inserting into a mold the injection molded article made by the step of double injection molding the color resin and then, double injection molding a second transparent cover on a front surface of the first transparent cover.

4 Claims, 7 Drawing Sheets

(51) Int. Cl.
  *G01S 13/93* (2020.01)
  *H01Q 1/40* (2006.01)
  *B29C 45/00* (2006.01)
  *B29C 65/02* (2006.01)
  *H01Q 1/32* (2006.01)
  *G01S 13/931* (2020.01)
  *H01Q 1/42* (2006.01)
  *B29L 31/30* (2006.01)
  *G01S 7/02* (2006.01)
  *B29K 69/00* (2006.01)
  *B29L 31/34* (2006.01)

(52) U.S. Cl.
  CPC .... *B29K 2069/00* (2013.01); *B29K 2995/002* (2013.01); *B29K 2995/0025* (2013.01); *B29K 2995/0026* (2013.01); *B29L 2031/30* (2013.01); *B29L 2031/3456* (2013.01); *G01S 2007/027* (2013.01); *G01S 2013/9321* (2013.01); *G01S 2013/93271* (2020.01); *H01Q 1/3233* (2013.01)

(58) Field of Classification Search
  CPC ............ B29L 2031/30; B29K 2069/00; B29K 2995/0025; B29K 2995/002; B29K 2995/0026
  See application file for complete search history.

(56) References Cited

FOREIGN PATENT DOCUMENTS

| | | | |
|---|---|---|---|
| JP | 2009-018790 A | | 1/2009 |
| JP | 200918790 A | * | 1/2009 |
| JP | 2016-124113 A | | 7/2016 |

* cited by examiner (PRIOR ART)

(PRIOR ART)

METHOD OF MANUFACTURING RADAR TRANSPARENT COVER FOR VEHICLES AND RADAR TRANSPARENT COVER MANUFACTURED THEREBY

CROSS-REFERENCE(S) TO RELATED APPLICATIONS

The present application claims priority to Korean Patent Application No. 10-2016-0170781, filed on Dec. 14, 2016, the entire contents of which is incorporated herein for all purposes by this reference.

BACKGROUND OF THE INVENTION

Field of the Invention

Exemplary embodiments of the present invention relate to a radar transparent cover for a vehicle and a method of manufacturing the same.

Description of Related Art

Technology for automobiles has been infinitely evolving for human convenience.

Smart cruise control (SCC) is also one of the technologies being further developed. The present SCC is a system for detecting a speed of the vehicle in front, comparing the speed with a speed of an own vehicle, and controlling the own vehicle to run within the set speed while maintaining an inter-vehicle distance between the own vehicle and the preceding vehicle.

To realize such smart cruise control, an SCC detector is disposed in front of the vehicle to detect the vehicle in front, and a radar transparent cover (or SCC cover) is also disposed on a radiator grill in front of the vehicle to allow the transmitting and receiving radar beam of the SCC detector to transmit, and to protect the SCC detector.

Such a radar transparent cover must have a suitable performance of transmitting radar beam. In addition, since the radar transparent cover is provided in front of the vehicle, aesthetics of the vehicle must also be considered.

FIG. 1 shows a cross section of a radar transparent cover of the prior art, and FIG. 2 shows a cross section of a radar transparent cover in which a hole for mounting a camera is formed.

Referring to FIG. 1 and FIG. 2, a conventional radar transparent cover is manufactured by injection molding a transparent cover 1 of a polycarbonate (PC) material for transmitting radio waves, coating one surface of the transparent cover 1 with a printed layer for securing transmittance of radio waves, and integrally bonding a plastic resin 2 to a back surface of the transparent cover 1 by insert injection molding.

The plastic resin 2 may be for example an American Standards Association (ASA) black and can be embodied in different colors by injection molding. However, since the plastic resin 2 is injection molded by heterogeneous injection molding with the transparent cover 1, there will be a joint portion between the transparent cover and the plastic resin which are injection molded.

Bonding of the joint portion of these double layers is important because the radar transparent cover is disposed on a front grill of the vehicle and hence encounters environmental extreme conditions.

To bond the double layers, an undercut structure as well as an adhesive or the like is used, but there is a limitation in using them. When joint surfaces become unstable, a problem may occur that the joint surfaces gap later. Particularly, when water penetrates through the gap, the appearance of a product is damaged and discolored, and performance of the radar is affected thereby resulting in involving a risk of human life due to an accident caused by the malfunction of the radar.

Further, when a hole for mounting a camera or the like is formed at the center of the cover as shown in FIG. 2, an undercut cannot be embodied due to the mold structure, which is more vulnerable in terms of the structure for preventing moisture penetration.

That is, to embody the undercut without a plastic resin layer being exposed to the front surface, the undercut must be formed first on the inner surface of a hole of a product to be injection molded, and secondarily the undercut portion must be filled with a resin; however, the undercut cannot be embodied because a slide cannot be operated inside the hole.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of manufacturing a radar transparent cover wherein a joint portion between a transparent cover layer and a plastic resin layer of the radar transparent cover is prevented from being easily gapped, or moisture is prevented from penetrating into the cover. Various aspects of the present invention are also directed to providing a radar transparent cover manufactured by the method.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method of manufacturing a radar transparent cover including steps of: injection molding a first transparent cover; inserting into a mold the first transparent cover made by the step of injection molding the first transparent cover, and then double injection molding a color resin on a back surface of the first transparent cover; and inserting into a mold the injection molded article made by the step of double injection molding the color resin and then double injection molding a second transparent cover on a front surface of the first transparent cover.

The first transparent cover and the second transparent cover are made of a PC material.

Further, the method further includes a step of forming an undercut on at least one side portion of the first transparent cover in the step of double injection molding the second transparent cover.

The step of double injection molding the color resin is performed wherein at least one surface of the first transparent cover is surrounded with the color resin.

The step of double injection molding the second transparent cover is performed wherein at least one surface of the first transparent cover is surrounded with the second transparent cover.

Alternatively, at least one surface of the first transparent cover is injection molded to prevent exposure to the outside by the step of double injection molding the color resin and the step of double injection molding the second transparent cover.

In accordance with another aspect of the present invention, there is provided a radar transparent cover in which a first transparent cover made of a material configured for transmitting radio waves, a color resin bonded to a back surface of the first transparent cover, and a second transparent cover bonded to a front surface of the first transparent cover are laminated.

Further, the first transparent cover to be injection molded is combined with the color resin by primary double injection molding and is bonded to the second transparent cover by secondary double injection molding.

Further, the first transparent cover and the second transparent cover are made of a PC material.

Further, the color resin is an ASA black material.

On the other hand, at least one surface of the first transparent cover is surrounded with the color resin and the second transparent cover.

Further, at least one side portion of the first transparent cover is formed with an undercut.

Alternatively, at least one surface of the first transparent cover is not exposed to the outside.

Further, the color resin and the second transparent cover are bonded to one side portion of the surface of the first transparent cover that is not exposed to the outside.

In accordance with still another aspect of the present invention, there is provided a radar transparent cover including a first transparent cover made of a material configured for transmitting radio waves, a resin layer made of a material different from the first transparent cover and bonded to a back surface of the first transparent cover, and a second transparent cover bonded to the first transparent cover with the same material as the first transparent cover when bonded to a front surface of the first transparent cover.

In the radar transparent cover manufactured by the method of manufacturing a radar transparent cover according to an exemplary embodiment of the present invention, as it is manufactured by double injection molding a color resin layer to a first transparent cover and then double injection molding a second transparent cover to the first transparent cover, a portion where the first transparent cover abuts against the color resin layer or the second transparent cover is not exposed to the outside.

In other words, since the color resin layer and the second transparent cover are formed such that they enclose all the external sides of the first transparent cover, the first transparent cover is not easily gapped from a joint portion and a risk of moisture penetration through the joint portion is also removed, enhancing safety of a product.

Further, since the second transparent cover of the same material as the first transparent cover is double injection molded on the first transparent cover, more rigid bonding therebetween becomes possible.

In addition, since an undercut can be shaped when the second transparent cover is formed by tertiary injection molding, the present method is free to embody the shape of a product and formation of an undercut, and it is also advantageous in forming an undercut in a hole including a hole for mounting a camera or the like.

Further, since the degree of freedom in embodying the undercut is high, the degree of freedom of a mold can be increased, for example, molding can be performed without restriction to the depth and thickness of the undercut regardless of whether a slide core or a slant core is applied.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
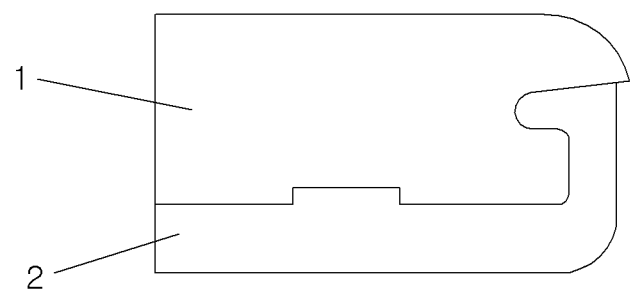
FIG. 1 shows a cross section of a radar transparent cover according to the prior art.
Figure 2:
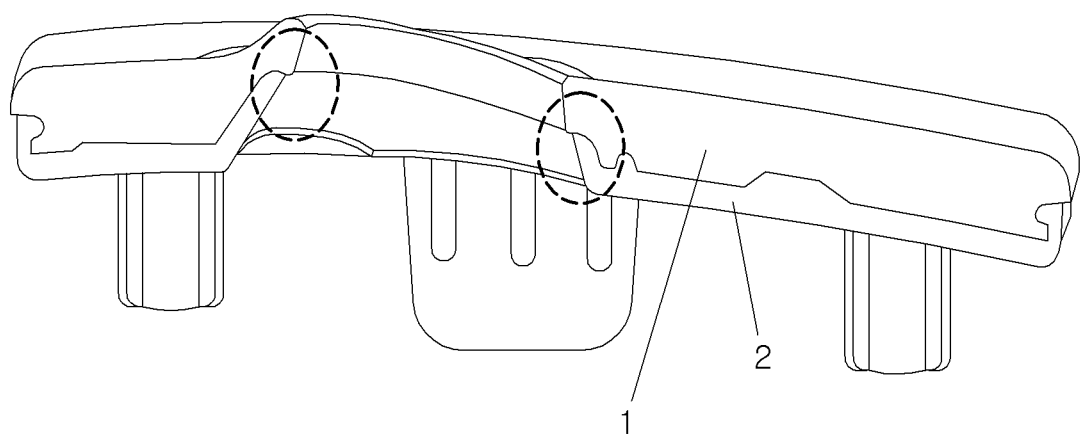
FIG. 2 shows a cross section of a hole portion of a radar transparent cover according to the prior art.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

To fully understand the present invention, operational advantages of the present invention and objects achieved by implementing the present invention, the accompanying drawings exemplifying exemplary embodiments of the present invention and contents described in the accompanying drawings need to be referred to.

In describing the exemplary embodiments, detailed description of technology known in the art or iterative description may be made shortly or omitted to avoid obscuring the subject matter of the present invention.

Figure 3:
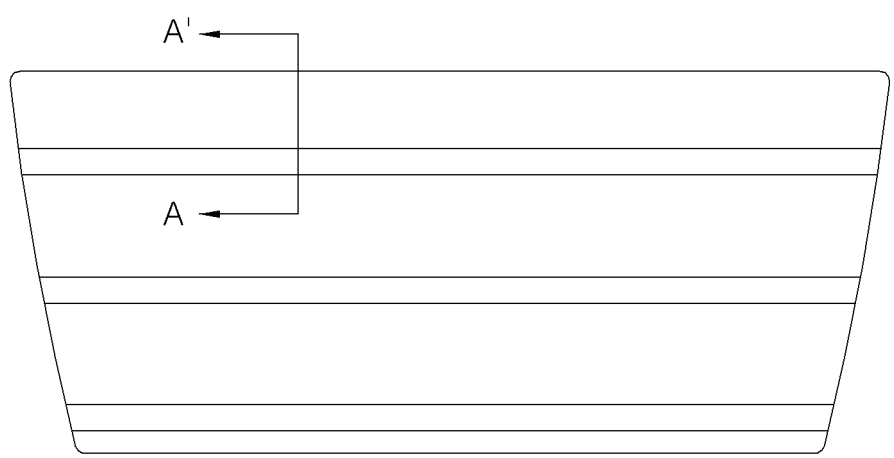
FIG. 3 is a front view of a radar transparent cover according to an exemplary embodiment of the present invention.
Figure 4:
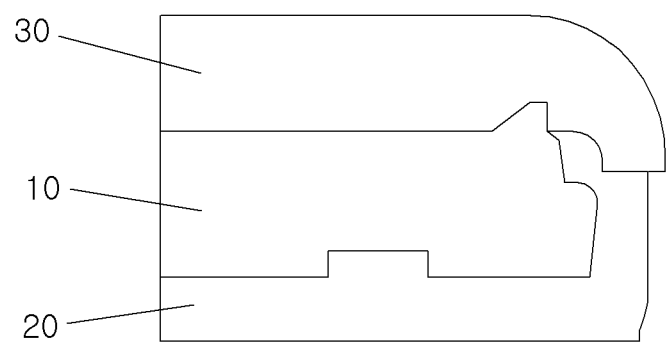
FIG. 4 shows a cross section taken along line A-A' of FIG. 3.
Figure 5:
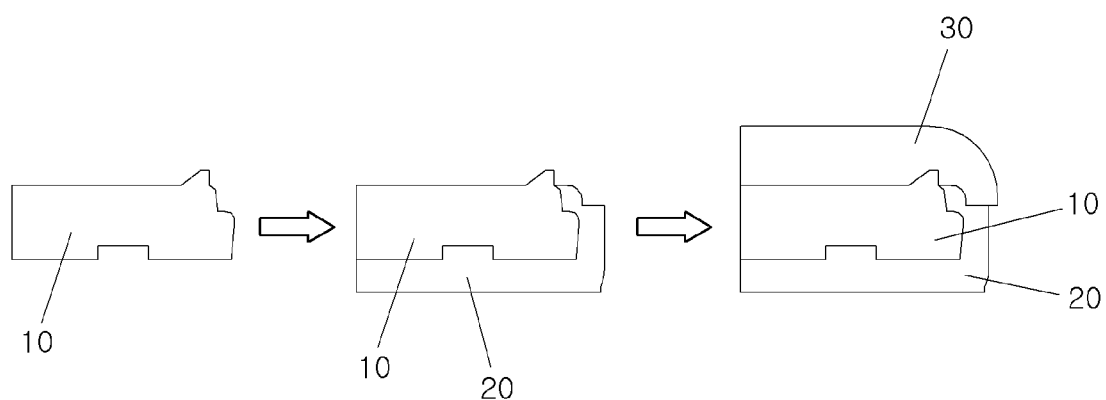
FIG. 5 shows manufacturing processes of the radar transparent cover shown in FIG. 4 according to an exemplary embodiment of the present invention.

FIG. 3 shows a front view of a radar transparent cover according to an exemplary embodiment of the present invention, FIG. 4 shows a cross section taken along line A-A' of FIG. 3, and FIG. 5 shows manufacturing processes of the radar transparent cover shown in FIG. 4 according to an exemplary embodiment of the present invention.

Hereinafter, a method of manufacturing a radar transparent cover according to an exemplary embodiment of the present invention and a radar transparent cover manufactured will be described with reference to FIG. 3 to FIG. 5.

By the method of manufacturing a radar transparent cover according to an exemplary embodiment of the present invention, the radar transparent cover is manufactured as a triple structure through twice double injection molding of two transparent cover layers and a color resin layer rather than double injection molding of a transparent convert and a plastic resin as in the prior arts, minimizing exposure of a joint portion between the transparent cover and the resin layer.

The horizontal pattern shown in FIG. 3 corresponds to a decorative design formed in consideration of the appearance of a product.

Further, as shown in FIG. 4, the radar transparent cover has a triple structure in which a color resin 20 is formed on a back surface of a first transparent cover 10, and a second transparent cover 30 is bonded to a front surface of the first transparent cover 10.

To the present end, as shown in FIG. 5, the first transparent cover 10 is manufactured by injection molding and a metal printed layer is formed on the back surface of the first transparent cover 10. Then, the present structure is put into a mold and then formed as a layer together with the color resin 20 by double injection molding.

The present double layer is then put into a mold and bonded together with the second transparent cover 30 by double injection molding.

The first transparent cover 10 and the second transparent cover 30 are preferably made of a PC material as a non-metallic transparent resin in consideration of the possibility of transmission of radio waves.

Further, the color resin 20 is a layer which is formed in consideration of the appearance of the vehicle. The color resin 20 is a material different from that of the transparent cover, which may be ASA Black, and bonded to the transparent cover.

As shown in the drawings, the radar transparent cover to be manufactured in accordance with the present invention is manufactured such that the color resin 20 and the second transparent cover 30 enclose at least one side of the first transparent cover 10.

In other words, the radar transparent cover is manufactured such that at least one side of the first transparent cover 10 is not exposed to the outside but the color resin 20 and the second transparent cover 30 are exposed to the outside from at least one side, and in turn a side joint portion between the first transparent cover 10 and the color resin 20 and a side joint portion between the first transparent cover and the second transparent cover 30 are not exposed to the outside.

Since the radar transparent cover according to an exemplary embodiment of the present invention has a double bonding structure of such configuration, there is little risk that the sides are easily gapped and hence moisture permeates within the cover. Further, even when the joint portion between the color resin 20 and the second transparent cover 30 is gapped, bonding of the first transparent cover 10 is not deteriorated.

Moreover, since the second transparent cover 30 of the same material as the first transparent cover 10 is bonded on the first transparent cover 10, they are bonded completely by double injection molding so that it is possible to accomplish rigid bonding.

On the other hand, the present triple injection structure can realize an undercut in various shapes that cannot be realized by a double injection structure, increasing the degree of freedom of a mold for primary and secondary injection molding.

In the double injection structure, since an undercut may be formed in a primary injection molded article and then a resin may be filled in the undercut portion in secondary injection molding process, it is possible to embody only a simple shape of the undercut while any internal undercut including a circular hole cannot be embodied.

However, in the triple injection structure according the present invention, since the undercut can be formed in a tertiary injection molding process without a need to form the undercut in a primary injection molding process, it is free to not only embody shape of a product but also embody shape of an undercut in all portions including an internal portion of a hole shape.

Further, since the degree of freedom in embodying the undercut is high and hence molding can be performed without restriction to the depth and thickness of the undercut regardless of whether a slide core or a slant core is applied, water tightness as well as the degree of freedom of a mold can be enhanced.

Figure 7:
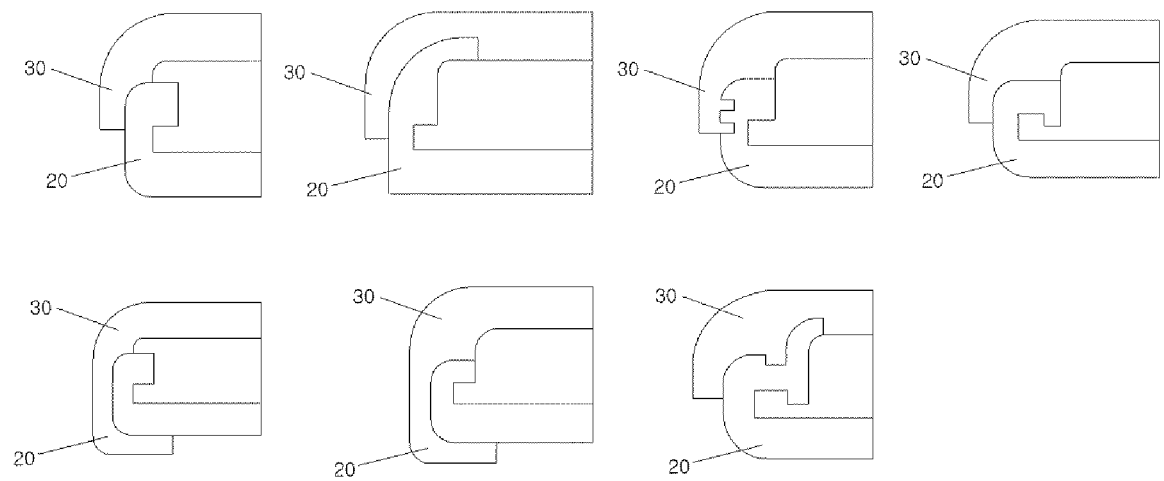
FIG. 7 illustrates shapes of an undercut that can be made by a method of manufacturing a radar transparent cover according to an exemplary embodiment of the present invention; and It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

FIG. 7 illustrates various radar transparent covers that can be manufactured with various forms of undercuts as described above.

Figure 6:
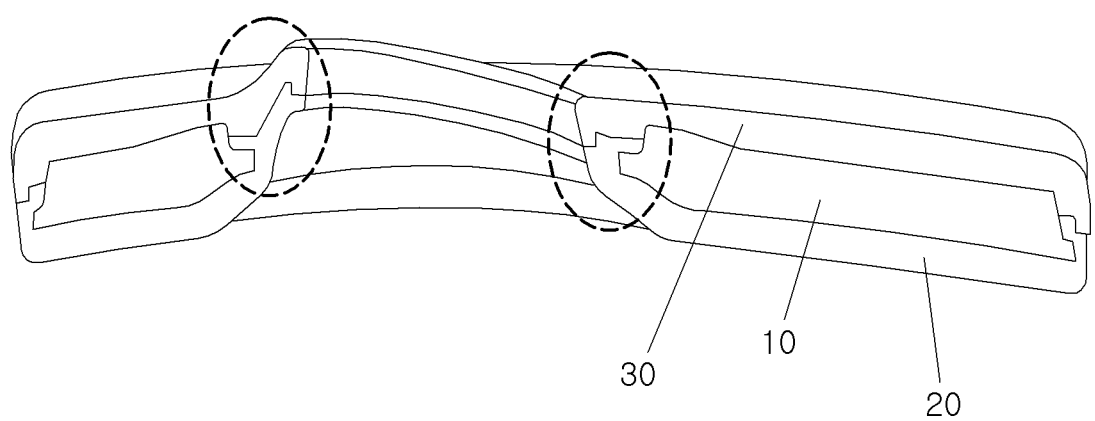
FIG. 6 shows a cross section of a hole portion of a radar transparent cover according to an exemplary embodiment of the present invention.

Further, since an undercut structure can be applied even when there is a center hole for mounting a camera or the like as shown in FIG. 6, permeation of moisture can be fully prevented.

Additionally, resins used in the primary and tertiary injection molding processes are a transparent PC-based resin, which is a thermoplastic resin that can melt again and have fluidity when heated even after being molded.

The melting point of the PC resin is 220° C. to 230° C. and injection molding temperature is 270° C. to 300° C. Accordingly, when the PC resin is injected onto a surface of the molded PC layer, the molten PC resin being injected softens the surface of the molded PC layer and hence the two resin layers are bonded and in turn solidified as a single product while interface between the layers disappears after the injection molding.

By use of the present double injection molding process, a pin point gate can be applied to the center of the primary product and gate marks can be eliminated completely after double injection of the same resin.

As discussed above, the radar transparent cover manufactured by the method of manufacturing a radar transparent cover according to an exemplary embodiment of the present invention has advantageous effects that the watertight structure is improved, bonding between layers is more rigid by an improvement of the degree of freedom of an undercut, and the degree of freedom of a mold is increased to be beneficial to the process.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a radar transparent cover, the method comprising steps of:

injection molding a first transparent cover;

inserting into a mold the first transparent cover made by the step of injection molding the first transparent cover and then double injection molding a color resin on a back surface of the first transparent cover, wherein the color resin is also molded so as to cover a peripheral surface of the first transparent cover to produce a colored transparent cover, and inserting into a mold the colored transparent cover and then double injection molding a second transparent cover on a front surface of the colored transparent cover, wherein the second transparent cover is molded so as to surround at least a portion of the color resin of a periphery of the colored transparent cover.

2. The method according to claim 1, wherein the first transparent cover and the second transparent cover are made of a polycarbonate (PC) material.

3. The method according to claim 2, further including a step of forming an undercut on at least one side portion of the first transparent cover in the step of double injection molding the second transparent cover.

4. The method according to claim 1, wherein at least one surface of the first transparent cover is injection molded to prevent exposure to an outside thereof by the step of double injection molding the color resin and the step of double injection molding the second transparent cover.

* * * * *